(12) United States Patent
Kanamaru

(10) Patent No.: US 9,459,648 B2
(45) Date of Patent: Oct. 4, 2016

(54) AC COUPLED SINGLE-ENDED LVDS RECEIVING CIRCUIT COMPRISING LOW-PASS FILTER AND VOLTAGE REGULATOR

(75) Inventor: Hiroki Kanamaru, Kobe (JP)

(73) Assignee: GVBB HOLDINGS S.A.R.L., Luxembourg (LU)

( * ) Notice: Subject to any disclaimer, the term of this patent is extended or adjusted under 35 U.S.C. 154(b) by 400 days.

(21) Appl. No.: 13/814,485

(22) PCT Filed: Aug. 5, 2011

(86) PCT No.: PCT/JP2011/004474
§ 371 (c)(1),
(2), (4) Date: May 13, 2013

(87) PCT Pub. No.: WO2012/017691
PCT Pub. Date: Feb. 9, 2012

(65) Prior Publication Data
US 2013/0229165 A1    Sep. 5, 2013

(30) Foreign Application Priority Data

Aug. 5, 2010 (JP) .................................. 2010-176236

(51) Int. Cl.
G05F 1/67 (2006.01)
G05F 5/00 (2006.01)
H04L 25/02 (2006.01)

(52) U.S. Cl.
CPC .............. G05F 5/00 (2013.01); H04L 25/0276 (2013.01); H04L 25/0294 (2013.01); H04L 25/0298 (2013.01)

(58) Field of Classification Search
CPC .............. G05F 1/10; G05F 1/12; G05F 1/13; G05F 1/46; G05F 7/00; H04L 25/0274

USPC .......... 327/65, 67, 108–112, 116, 117, 345; 326/82–87, 21–24, 29, 62, 89–91; 398/128, 129, 135–139, 158, 159, 161; 331/16–17; 330/258

See application file for complete search history.

(56) References Cited

U.S. PATENT DOCUMENTS

| 4,541,069 A | 9/1985 | Kanou et al. |
| 6,448,821 B1 * | 9/2002 | Sakurai ............ G01R 19/16519 327/56 |
| 6,806,728 B2 * | 10/2004 | Nguyen ............ G06F 13/4086 326/26 |

FOREIGN PATENT DOCUMENTS

JP    54-118148    9/1979

OTHER PUBLICATIONS

AND8020/D Termination of ECL Logic Devices on Semiconductor Logic Applications Engineering. Prepared by Paul Shockman, May 2002.*

(Continued)

*Primary Examiner* — Yemane Mehari
(74) *Attorney, Agent, or Firm* — Arent Fox LLP

(57) ABSTRACT

A receiving circuit is provided that can accurately detect a clock signal that has a single phase and a small amplitude. A receiving circuit includes an AC coupled circuit 22 that creates an AC coupling between a first end and a second end, a low-pass filter circuit 23, 25 that produces a third signal by applying a low-pass filtering on a second signal that is produced on the second end in response to a first signal that is applied to the first end, and a comparator 21 that inputs the second signal and the third signal.

9 Claims, 2 Drawing Sheets

(56) References Cited

OTHER PUBLICATIONS

Decision to Reject dated Aug. 4, 2014 regarding Japan Application No. JP2010-176236.
Decision to Reject Amendment dated Aug. 4, 2014 regarding Japan Application No. JP2010-176236.
Notice of Reasons for Rejection dated Dec. 17, 2013 regarding Japan Application No. JP2010-176236.
Notice of Reasons for Rejection dated Apr. 15, 2014 regarding Japan Application No. JP2010-176236.
International Search Report for International Application No. PCT/JP2011/004474 mailed by the European Patent Office on Dec. 6, 2011 (3 pages).
Written Opinion for International Application No. PCT/JP2011/004474 mailed by the European Patent Office on Dec. 6, 2011 (9 pages).
Shockman, P. "ANDS020/D Termination of ECL Logic Devices", On Semiconductor Logic Applications Engineering, AND8020/D Application Note, Semiconductor Components Industries, Denver, USA, No. Rev. 2, May 1, 2002.
Texas Instruments: "SN65LVDS108 8-Port LVDS Repeater", May 1, 2001 Retrieved from the Internet: URL:http://www.datasheetcatalog.org/datasheet/texasinstruments/sn65lvds108.pdf [retrieved on Nov. 23, 2011].

* cited by examiner

AC COUPLED SINGLE-ENDED LVDS RECEIVING CIRCUIT COMPRISING LOW-PASS FILTER AND VOLTAGE REGULATOR

TECHNICAL FIELD

The present invention generally relates to a receiving circuit, a signal transmitting circuit, and a signal receiving method, and more particularly, relates to a receiving circuit that receives a clock signal, a signal transmitting circuit that transmits a clock signal, and a signal receiving method for receiving a clock signal.

BACKGROUND ART

When a clock signal is transmitted from a transmitting side to a receiving side in an electronic device, an electromagnetic wave is produced by the clock signal during propagation in a transmission line. When the electromagnetic wave has a high intensity, the electromagnetic wave may act as EMI (electro-magnetic interference) noise. A wiring configuration in which a damping resistor or an EMI filter is interposed into the clock transmitting side is generally employed for the purpose of reducing EMI noise.

FIG. 1 illustrates a configuration in which a damping resistor is interposed into a single clock wiring, and a clock signal is transmitted in a single phase. The configuration in FIG. 1 encounters the following problems. Firstly, the emission of the electromagnetic wave from the wiring increases in proportion to an increase in the wiring length. Furthermore, as the wiring length increases, the wiring capacity increases and the amplitude of the clock signal at the signal receiving end decreases. Although electromagnetic wave emission from the wiring and the effect of signal reflection can be reduced by increasing the damping resistor or the EMI filter, the amplitude of the clock signal at the signal receiving end decreases.

If the amplitude of the clock signal at the signal receiving end decreases, the signal voltage threshold required at the signal receiving side may not be reached, and therefore there is a risk that the clock signal will not be detected. Furthermore, there is the risk of increased jitter in the received clock signal as a result of the risk of an increase in the rise time and the fall time of the signal. FIG. 2 illustrates a configuration of transmitting a clock signal as a differential signal after damping by a damping resistor. The use of the differential configuration illustrated in FIG. 2 enables the following advantages in relation to the problems associated with the single-phase configuration illustrated in FIG. 1. Firstly, since the clock signal is transmitted in the form of a differential signal, electromagnetic wave emissions can be suppressed due to the fact that signals of opposite polarity cancel out mutual electromagnetic fields. Secondly, a clock signal transmitted in the form of a differential signal is strongly resistant to external noise, and the clock can be detected accurately by the signal receiving end even when the signal amplitude is reduced by long-range transmission of the clock signal.

The configuration illustrated in FIG. 2 uses LVDS (low voltage differential signaling) for example as the differential signal system. LVDS is a normalized standard that realizes a comparatively high data rate with low power consumption. The configuration illustrated in FIG. 2 disposes an LVDS transmitter 10 and an LVDS receiver 11 respectively at the transmitting end and the receiving end, and uses a differential 100 ohm wiring 12 to connect the LVDS transmitter 10 and the LVDS receiver 11. This configuration results in a considerable cost increase in comparison to the configuration in FIG. 1 due to the addition of components (LVDS transmitter and receiver) to both the transmitting end and the receiving end. Furthermore, the requirement for the wiring 12 between the LVDS transmitter 10 and the LVDS receiver 11 to be designated differential 100 ohm wiring has the effect of limiting the degree of freedom in respect of the wiring layout.

Transmission of the clock signal in single phase is preferred in view of the degree of freedom in the wiring layout, and cost. However, single-phase clock transmission requires a configuration that enables accurate detection of the clock signal at the receiving end even when EMI noise is sufficiently reduced by a damping resistor.

Several publications disclose a configuration in which a clock signal is transmitted in single phase, and the clock signal is received by an LVDS receiver (for example, Non-patent Literatures 1 and 2). The configuration disclosed in these publications applies a clock signal, that is regulated to a suitable amplitude by a series of resistors, to a first end of an LVDS receiver, and applies a reference voltage, that is produced by the dividing of the power source voltage with the series of resistors, to the second end of the LVDS receiver. The effect of power source noise on the reference voltage is eliminated by interposing a capacitor between the LVDS receiver and the GND of the second end. This configuration enables detection of the clock signal by comparing the fixed reference voltage with the voltage of the clock signal that includes a DC component. However, when there is a distortion in the amplitude of the clock signal or a deviation in the DC component as a result of the effect of the wiring for example, the relationship between the reference voltage and the received clock signal voltage diverges from an ideal voltage relationship, and suitable signal detection is not enabled.

CITATION LIST

Non Patent Literature

NPL 1: Chris Sterzik, "Interfacing Different Logic With LVDS Receivers", TEXAS INSTRUMENT Application Report SLLA101—September 2001 (USA)
NPL 2: "Interfacing LVDS to PECL, LVPECL, CML, RS-422 and single-ended devices", PERICOR4 Application Note 47, 2002 (USA)

SUMMARY OF INVENTION

In accordance with a first aspect of the present invention, there is provided a receiving circuit including: an AC coupled circuit that creates an AC coupling between a first end and a second end;
a low-pass filter circuit that produces a third signal by applying a low-pass filtering on a second signal that is produced on the second end in response to a first signal that is applied to the first end; and
a comparator that inputs the second signal and the third signal.

In accordance with another aspect of the present invention, there is provided a signal transmitting circuit, including: a single-phase transmitting wiring; a damping resistor interposed in the transmitting wiring; an AC coupled circuit that creates an AC coupling between a first end and a second end, the first end connected to a receiving side of the transmitting wiring; a low-pass filter circuit that produces a third signal by applying a low-pass filtering on a second signal produced on the second end in response to a first signal that is applied to the first end; and a comparator that inputs the second signal and the third signal.

In accordance with a yet another aspect of the present invention, there is provided a signal receiving method, including the steps of: extracting AC components from a received signal; adding the AC components to a predetermined potential to produce a first voltage signal; applying a low-pass filtering on the first voltage signal to produce a second voltage signal; and comparing the first voltage signal and the second voltage signal.

EXPLANATION OF REFERENCE NUMERALS

21 COMPARATOR
22 and 23 CAPACITATIVE ELEMENTS
24, 25, 26 and 27 RESISTOR ELEMENTS
28 CLOCK RECEIVING END
29 CLOCK OUTPUT END
30 CLOCK SENDING END
31 DAMPING RESISTOR
32 TRANSMITTING WIRING

PREFERRED MODE FOR CARRYING OUT THE INVENTION

The embodiments of the present invention will be described in detail below with reference to the attached drawings.

Figure 3:
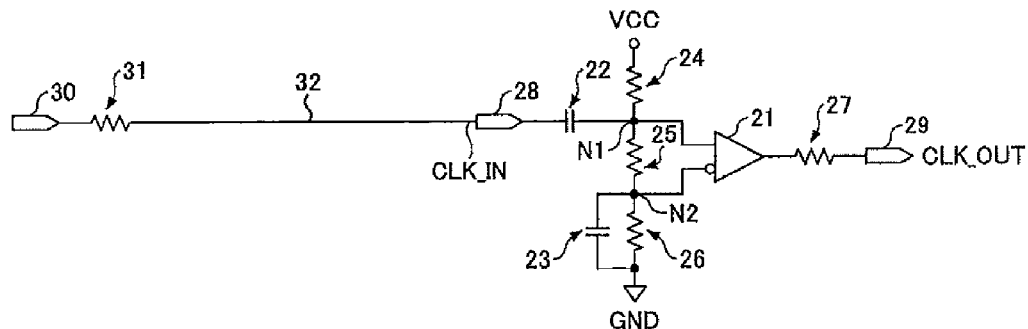
FIG. 3 illustrates a first embodiment of a receiving circuit.

FIG. 3 illustrates a first embodiment of a receiving circuit. The receiving circuit illustrated in FIG. 3 includes a comparator 21, capacitative elements 22 and 23, resistor elements 24 to 27, a clock receiving end 28, and a clock output end 29. The clock receiving end 28 is connected to the receiving side of a single-phase transmitting wiring 32. A damping resistor 31 may be interposed in the transmitting side in proximity to the transmitting end 30 of the transmitting wiring 32.

The capacitative element 22 functions as an AC coupled circuit creating a capacitative coupling between the clock receiving end 28 that acts as a first end and a node N1 that acts as a second end. When a clock signal CLK_IN is applied from the transmitting wiring 32 to the clock receiving end 28, a detection clock signal is produced in the node N1 in response to the clock signal CLK_IN. The detection clock signal is a signal that is a sum of a DC component in the form of a potential specified by the resistor element series 24 to 26 and a clock signal that is obtained as a result of removing DC components from the clock signal CLK_IN by the action of the capacitative elements 22. The circuit portion that includes the resistor element 25 and the capacitative element 23 functions as a low-pass filter, and applies the low-pass filtering on the detection clock signal that is produced in the node N1, thereby producing a reference signal in the node N2. The reference signal is ideally a fixed voltage value that is equivalent to the average voltage of the detection clock signal. However, actually, the signal undergoes fluctuation and has a small amplitude in proximity to the average voltage.

The comparator 21 receives the detection clock signal that is produced in the node N1 on the non-inverting input end, and receives the reference signal that is produced in the node N2 on the inverting input end. When the duty of the clock signal is 50%, the voltage of the inverting input end of the comparator 21 (voltage of the reference signal) is generally the median value in the voltage fluctuation range of the clock signal. The comparator 21 outputs a HIGH-level signal when the detection clock signal has a higher voltage than the reference signal, and outputs a LOW-level signal when the voltage of the detection clock signal has a lower voltage than the reference signal. The output signal of the comparator 21 is supplied through the resistor element 27 that functions as a damping resistor, from the clock output end 29 as a clock signal output CLK_OUT to the circuit in the subsequent stage. There is no requirement for provision of the damping resistor element 27.

The comparator 21 may for example be an LVDS receiver. The resistor elements 24 to 26 provided between the power source voltage VCC and the ground voltage GND may function as a voltage regulating circuit that matches the voltage value of the input signal of the LVDS receiver 21 to the LVDS receiver rating.

The LVDS receiving rating is specified as TIA/EIA-644 of ANSI (American National Standards Institute). More specifically, the transmission impedance of the line (cable) is specified as 100 ohm, the receiver termination resistor is 100 ohms, the signal amplitude is plus-minus 400 mV, and the common mode voltage is 1.2V plus-minus 1.0V at the input end. A resistor series for voltage regulation includes a resistor element 24 connected between the power source voltage VCC and the non-inverting input end of the LVDS receiver 21, a resistor element 25 connected between the non-inverting input end and the inverting input end of the LVDS receiver 21, and a resistor element 26 connected between the inverting input end and the ground voltage GND. For example, the resistor elements 24, 25, 26 may respectively be configured as 8.2 kilo-ohms, 100 ohms, and 4.7 kilo-ohms. In this case, when the power source voltage VCC for example is set to 3.3V, the voltage of the node N1 when there is no clock input becomes 3.3V×(100+4700)/(8200+100+4700) which is approximately 1.2V. In other words, a resistor series configured from the resistor elements 24 to 26 matches the common mode voltage of the input signal from the LVDS receiver 21 to the LVDS receiver rating (1.2V plus-minus 1.0V). The detection clock signal that is produced in the node N1 represents the sum of the AC components of the input clock signal CLK_IN and the voltage of approximately 1.2V. The capacitative element 22 may be set, for example, to 0.1-micro farad, and the capacitative element 23 may be set for example to 1 micro-farad.

The receiving circuit illustrated in FIG. 3 detects the clock signal after the AC coupled circuit eliminates the DC components from the clock signal input. Therefore, clock signal detection is enabled without any effect related to the magnitude of the DC components on the transmitting wiring 32. The receiving circuit in FIG. 3 detects the clock signal based on the difference between the clock signal and the average voltage of the clock signal. Therefore, the clock signal can be detected accurately even if the amplitude of the clock signal CLK_IN at the clock receiving end 28 is small (for example, even if 1V or less). The clock signal can be detected even if the amplitude of the clock signal is small. Accordingly, the amplitude of the clock signal can be reduced by increasing the damping resistor 31, for example, to 50 ohms-200 ohms. Consequently, emissions from the transmitting wiring 32 can be suppressed. Furthermore, since there is no restriction on the transmission line as in the wiring configuration illustrated in FIG. 2, the degree of freedom in relation to wiring layout can be improved. Furthermore, cost advantages are obtained in comparison to the wiring configuration illustrated in FIG. 2 since an LVDS receiver may only be provided on the receiving side, and there is no requirement for an LVDS transmitter on the transmitting side. Furthermore, the duty ratio of the clock signal can be corrected appropriately by selecting constants for the capacitative elements and the resistor elements.

Figure 1:
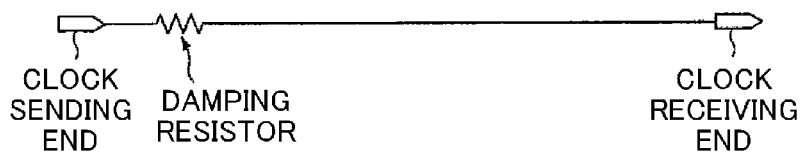
FIG. 1 illustrates a configuration in which a damping resistor is interposed into a single clock wiring, and a clock signal is transmitted in a single phase.
Figure 2:
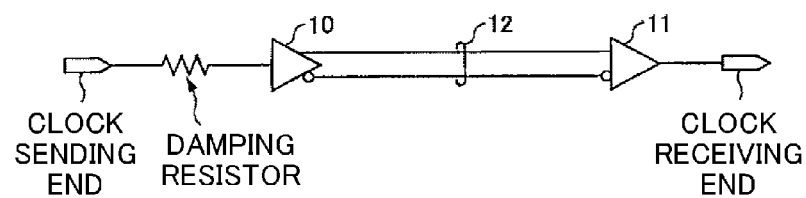
FIG. 2 illustrates a configuration of transmitting the clock signal as a differential signal after damping by a damping resistor.

The component cost of the signal transmitting circuit illustrated in FIG. 2 will be compared below with the component cost of the signal transmitting circuit illustrated in FIG. 3. Two LVDS devices are used in the signal transmitting circuit illustrated in FIG. 2. Since the cost of one LVDS device is approximately $0.5 (US$), the total component cost is approximately $1. In contrast, one LVDS device, two capacitative elements, and three resistor elements are used in the signal transmitting circuit illustrated in FIG. 3. Since the cost of one LVDS device is approximately $0.5 (US$), and the cost of the capacitative elements, and the resistor elements is approximately $0.01 per element, the total component costs is approximately $0.55. Therefore, in comparison with the signal transmitting circuit illustrated in FIG. 2, the signal transmitting circuit illustrated in FIG. 3 can be made at a low cost. The respective elements including the resistor element and the capacitative element in the receiving circuit illustrated in FIG. 3 can be mounted at the same time as the LVDS device, and therefore, there is no need to consider mounting costs in relation to each element.

Figure 4:
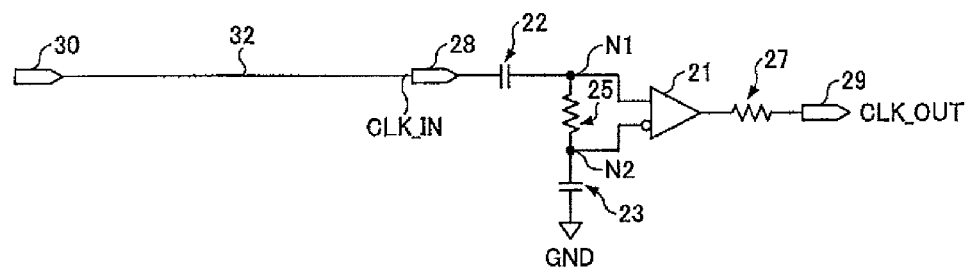
FIG. 4 illustrates a second embodiment of a receiving circuit.

FIG. 4 illustrates a second embodiment of a receiving circuit. The constituent elements in FIG. 4 that are the same as those in FIG. 3 are denoted by the same reference numerals, and description thereof will be omitted as suitable. In the receiving circuit illustrated in FIG. 4, the resistor elements 24 and 26 are omitted from the receiving circuit illustrated in FIG. 3. It is not necessary to provide the resistor elements 24 and 26 that function as a voltage regulating circuit based on the ground voltage GND and the power source voltage VCC as long as the comparator 21 can execute a suitable comparative operation for a wide range of input voltage, approximating an ideal comparator. Even if that the comparator 21 is an LVDS receiver, if conditions are satisfied that enable operation at the LVDS-receiver bias value, there is no requirement to provide the resistor elements 24 and 26 that function as a voltage regulating circuit. Rather than omitting both the resistor elements 24 and 26, a configuration is possible in which either one of the resistor element 24 on the power source voltage VCC or the resistor element 26 on the ground voltage GND is omitted.

When the clock signal CLK_IN is applied to the clock receiving end 28 from the transmitting wiring 32, a detection clock signal is produced in the node N1 in response to the input clock signal CLK_IN. The detection clock signal is a clock signal obtained as a result of removing the DC components from the clock signal CLK_IN. The circuit portion that includes the resistor element 25 and the capacitative element 23 functions as a low-pass filter, and applies the low-pass filtering on the detection clock signal that is produced in the node N1, thereby producing a reference signal in the node N2. The comparator 21 compares the detection clock signal that is produced in the node N1 with the reference signal that is produced in the node N2, and produces an output signal in response to the comparison result.

The damping resistor 31 illustrated in FIG. 3 is omitted from the signal transmitting circuit illustrated in FIG. 4. Depending upon the voltage level and signal quality of the clock signal, the resulting EMI noise may not be overly large, and a damping resistor may not be required. The signal transmitting circuit illustrated in FIG. 4 is configured based on such an arrangement.

Figure 5:
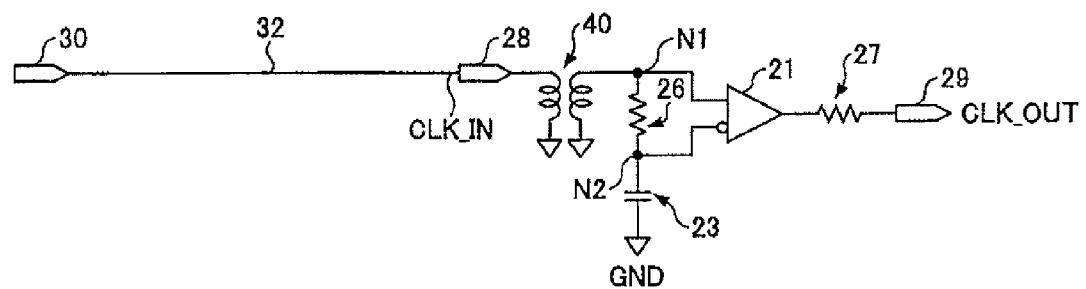
FIG. 5 illustrates a third embodiment of a receiving circuit.

FIG. 5 illustrates a third embodiment of a receiving circuit. The constituent elements in FIG. 5 that are the same as those in FIG. 4 are denoted by the same reference numerals, and description thereof will be omitted as suitable. The capacitative element 22 in the receiving circuit illustrated in FIG. 3 and FIG. 4 functions as an AC coupled circuit that creates capacitative coupling between the clock receiving end 28 and the node N1. In contrast, a transformer 40 in the receiving circuit illustrated in FIG. 5 functions as an AC coupled circuit that creates an inductive coupling between the clock receiving end 28 and the node N1.

When the clock signal CLK_IN from the transmitting wiring 32 is applied to the clock receiving end 28, a detection clock signal corresponding to the input clock signal CLK_IN is produced in the node N1 via the transformer 40. The detection clock signal is a clock signal obtained by removing DC components from the clock signal CLK_IN. A reference signal is produced in the node N2 by applying low-pass filtering on the detection clock signal that is produced in the node N1. The comparator 21 compares the detection clock signal and the reference signal, and produces an output signal in response to the comparison result.

Although the present invention has been described with reference to the embodiments, the present invention is not limited to the above-described embodiments, and various modifications may be possible without departing from the scope of the invention defined by the appended claims.

For example, although an example of a low-pass filter including a resistor element and a capacitative element has been described in the embodiments, there is no limitation in respect of this example. The low-pass filter for example, may include a resistor element and an inductive element, or may include a resistor element, a capacitative element, and an inductive element. Although the AC coupling has been exemplified as a capacitative coupling or an inductive coupling, the AC coupled circuit may include both a capacitative coupling and an inductive coupling. The clock signal applied by the receiving circuit or the signal transmitting circuit in the present application is not necessarily limited to a signal having a fixed frequency or duty ratio. There is a case in which a clock frequency is periodically fluctuated so as to disperse the frequency spectrum and reduce the peak value for the purpose of reducing EMI noise. The receiving circuit or the signal transmitting circuit disclosed in the present application may be used in relation to a clock signal with this type of fluctuating frequency.

The invention claimed is:
1. A receiving circuit comprising:
an AC-coupled circuit configured to create an AC coupling between a first end and a second end;
a low-pass filter circuit configured to, in response to a first signal that is applied to the first end, apply a low-pass filtering on a second signal that is produced on the second end to produce a reference signal;

a comparator configured to receive an input of the second signal and the reference signal to produce an output signal; and a voltage-regulating circuit configured to match a voltage value of the second signal to a common-mode voltage rating of the comparator, wherein the voltage regulating circuit includes a series of resistors disposed between a power source voltage and a ground voltage.

2. The receiving circuit according to claim 1, wherein the comparator is a low voltage differential signaling (LVDS) receiver.

3. The receiving circuit according to claim 1, wherein the series of resistors comprises:
a first resistor connected between the power source voltage and a first input end of the LVDS receiver,
a second resistor connected between the first input end and a second input end of the LVDS receiver, and
a third resistor element connected between the second input end and the ground voltage.

4. The receiving circuit according to claim 1, wherein the AC coupled circuit includes a capacitive element.

5. The receiving circuit according to claim 1, wherein the low-pass filter circuit includes a resistor element and a capacitive element.

6. The receiving circuit according to claim 1, wherein the AC coupled circuit includes a transformer.

7. A signal transmitting circuit, comprising:
a single-phase transmitting wiring;
a damping resistor interposed in the transmitting wiring;
an AC-coupled circuit configured to create an AC coupling between a first end and a second end, the first end connected to a receiving side of the transmitting wiring;
a low-pass filter circuit configured to, in response to a first signal that is applied to a first end, apply a low-pass filtering on a second signal that is produced on the second end to produce a reference signal;
a comparator configured to receive an input of the second signal and the reference signal to produce an output signal; and
a voltage-regulating circuit configured to match a voltage value of the second signal to a common-mode voltage rating of the comparator, wherein the voltage regulating circuit includes a series of resistors disposed between a power source voltage and a ground voltage.

8. The signal transmitting circuit according to claim 7, wherein the comparator is a low voltage differential signaling (LVDS) receiver.

9. A signal receiving method, comprising the steps of:
extracting AC components from a received signal;
adding the AC components with a voltage regulating circuit to produce a first voltage signal that matches a common-mode voltage rating of a comparator, wherein the voltage regulating circuit includes a series of resistors disposed between a power source voltage and a ground voltage;
applying a low-pass filtering on the first voltage signal to produce a reference voltage signal; and
comparing the first voltage signal and the reference voltage signal at the comparator to produce an output signal.

* * * * *